United States Patent
Min et al.

(10) Patent No.: US 9,329,617 B2
(45) Date of Patent: May 3, 2016

(54) ACTIVE CONTROL METHOD OF PEDAL EFFORT FOR ACCELERATOR

(71) Applicants: Hyundai Motor Company, Seoul (KR); Kia Motors Corporation, Seoul (KR)

(72) Inventors: Jeong Seon Min, Gwangju (KR); Yang Rae Cho, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 301 days.

(21) Appl. No.: 13/941,246

(22) Filed: Jul. 12, 2013

(65) Prior Publication Data

US 2014/0309858 A1 Oct. 16, 2014

(30) Foreign Application Priority Data

Apr. 16, 2013 (KR) .................. 10-2013-0041354

(51) Int. Cl.
- G05G 1/40 (2008.04)
- G05G 5/03 (2008.04)
- B60K 26/02 (2006.01)
- G05G 1/44 (2008.04)

(52) U.S. Cl.
CPC .. G05G 1/40 (2013.01); G05G 5/03 (2013.01); B60K 26/021 (2013.01); G05G 1/44 (2013.01)

(58) Field of Classification Search
CPC .. B60K 26/021; B60K 2026/023; G05G 5/03; Y10T 74/20534
See application file for complete search history.

(56) References Cited

U.S. PATENT DOCUMENTS

| | | | | |
|---|---|---|---|---|
| 4,372,262 A * | 2/1983 | Kaniut | ................ | 123/179.22 |
| 6,751,534 B2 * | 6/2004 | Robichaux et al. | ............ | 701/22 |
| 7,715,969 B2 * | 5/2010 | Yamamura | .................. | 701/70 |
| 7,798,578 B2 * | 9/2010 | Lewis et al. | ................... | 303/151 |
| 7,835,842 B2 * | 11/2010 | Unterforsthuber | ............ | 701/54 |
| 8,532,891 B2 * | 9/2013 | Swartling | ...................... | 701/55 |
| 8,844,401 B2 * | 9/2014 | Sakaguchi et al. | ............ | 74/513 |
| 2009/0112382 A1 * | 4/2009 | Treharne et al. | ................ | 701/22 |
| 2010/0056325 A1 * | 3/2010 | Kahn et al. | ...................... | 477/3 |
| 2011/0098900 A1 * | 4/2011 | Shiomi et al. | .................. | 701/70 |
| 2011/0301791 A1 * | 12/2011 | Swales et al. | ................. | 701/22 |
| 2012/0216652 A1 * | 8/2012 | Yamazaki et al. | ............ | 74/513 |
| 2012/0279347 A1 * | 11/2012 | Schmitt et al. | .................. | 74/513 |
| 2012/0291587 A1 * | 11/2012 | Sakaguchi et al. | ............ | 74/513 |
| 2012/0304799 A1 * | 12/2012 | Noh et al. | ...................... | 74/512 |
| 2013/0049942 A1 * | 2/2013 | Kim et al. | .................... | 340/438 |
| 2013/0066508 A1 * | 3/2013 | Ueno et al. | .................... | 701/22 |
| 2014/0012449 A1 * | 1/2014 | Arita | .............................. | 701/22 |
| 2014/0109717 A1 * | 4/2014 | Maruyama et al. | ............ | 74/513 |

FOREIGN PATENT DOCUMENTS

| | | | |
|---|---|---|---|
| EP | 1695859 A1 * | 8/2006 | |
| KR | 20-0193347 Y1 | 8/2000 | |
| KR | 10-2002-0056583 A | 7/2002 | |
| KR | 10-2003-0046676 A | 6/2003 | |
| KR | 10-2008-0044687 A | 5/2008 | |
| KR | 2010-0063453 A | 6/2010 | |

* cited by examiner

Primary Examiner — Tuan C. To
Assistant Examiner — Donald J Wallace
(74) Attorney, Agent, or Firm — McDermott Will & Emery LLP

(57) ABSTRACT

An active control method of varying a pedal effort for an accelerator through which the current pedal effort for an accelerator can be varied actively to increase when an engine-off signal for a vehicle in which an accelerator a pedal effort of which is controllable is generated respectively.

8 Claims, 6 Drawing Sheets

ACTIVE CONTROL METHOD OF PEDAL EFFORT FOR ACCELERATOR

CROSS-REFERENCE TO RELATED APPLICATION

This application claims under 35 U.S.C. §119(a) priority to and the benefit of Korean Patent Application No. 10-2013-0041354, filed on Apr. 16, 2013, the entire contents of which are incorporated herein by reference.

TECHNICAL FIELD

The present disclosure relates to an active control method of pedal effort for an accelerator, and more particularly, to an active control method of pedal effort for an accelerator capable of preventing a rapid starting and a rapid acceleration when a vehicle engine starts for driving by actively varying the current pedal effort for an accelerator to increase when an engine-off signal is generated.

BACKGROUND

FIG. 1 shows an organ type accelerator for a vehicle as an example of where an accelerator according to the related art includes a pedal arm housing 1 fixed to a vehicle body panel under a driver's seat, a pedal arm 2 with one end rotatably connected to the pedal arm housing 1, a pedal bracket 3 fixed to a floor panel under a driver's seat, and a pedal pad 4 with one end rotatably hinged to the pedal bracket 3 and the other end ball-jointed to the pedal arm 2. A spring plate 5 is connected to one end of the pedal arm 2 which is disposed in the pedal arm housing 1, wherein one end of a spring 6 is supported by the spring plate 5 and the other end thereof is supported by the pedal arm housing 1.
In the accelerator according to the related art, pedal effort is transmitted to the pedal pad 4 such that the spring 6 is compressed when the pedal arm 2 rotates via a hinge shaft 7 with respect to the pedal arm housing 1. However, since an elastic coefficient of the spring 6 is set in advance to meet safe regulations prescribed by each nation, controlling pedal effort without replacing the spring 6 is impossible, and there is no method of actively controlling pedal effort for an accelerator in accordance with the state of engine-on or engine-off causing a rapid starting or a rapid acceleration when a vehicle engine starts-on.

The description provided above as the related art is just for helping the understanding of the background of the present disclosure, and should not be construed as being included in the related art known by those skilled in the art.

SUMMARY

The present disclosure has been made in an effort to solve the above-described problems associated with the prior art. The object of the present disclosure is to provide an active control method of pedal effort for an accelerator. When an engine-off signal of a vehicle in an accelerator is generated, the current pedal effort for an accelerator can be increased, and thereby after the vehicle engine starts-on for driving, rapid starting or rapid acceleration can be prevented to improve safety. Further, unnecessary consumption of fuel can be avoided by preventing a rapid increase of RPM.

Another object of the present disclosure is to provide an accelerator that is easily operated by causing an increased pedal effort to decrease when an engine-on signal is generated for a vehicle with an engine off.

An active control method of pedal effort for an accelerator includes determining whether an engine-off signal is generated in the vehicle provided with an accelerator having controllable pedal effort; controlling the current pedal effort to a set target pedal effort when the engine-off signal has been generated in an engine-off determining step; determining whether an engine-on is generated after a pedal effort increasing control step. and controlling the increased pedal effort from the pedal effort increasing control step to decrease to a set target pedal effort in accordance with locations of shifting stages and signals for releasing the brakes when the engine-on signal has been generated.

The current pedal effort for an accelerator may not increase to the set target pedal effort but be kept as an existing pedal effort (previous pedal effort) state, when the engine-off signal has not been generated in the engine-off determining step.

The active control method of pedal effort for an accelerator further includes a step for determining whether the increased pedal effort for an accelerator through the pedal effort increasing step corresponds to a target pedal effort after a predetermined time period is lapsed between the pedal effort increasing step and the engine-on determining step. In the pedal effort determining step, if the current pedal effort for an accelerator does not correspond to a target pedal effort for an accelerator, a warning signal is provided to a driver. When the increased pedal effort for an accelerator corresponds to a target pedal effort for an accelerator, pedal effort is maintained in an increasing state.

The current pedal effort is maintained as the increased pedal effort through the pedal effort increasing control step if the engine-on signal has not been generated in the engine-on determining step.

The pedal effort decreasing step is performed only if the signals for releasing brakes are generated while the current shifting stage is in a driving stage or a reverse stage after the engine-on step.

The active control method of pedal effort for an accelerator further includes a step for determining whether a pedal effort control system is in a normal state before determining the location of the shifting stage, and whether the signals for releasing brakes are generated in the pedal decreasing control step.

The logic for determining the location of the shifting stage and the signals for releasing brakes is performed when the pedal effort control system is in a normal state in the pedal control system determining step. When the pedal effort control system is in an abnormal state, the current pedal effort for an accelerator is reset as an initial pedal effort state.

Only when a voltage signal of a battery is normal, there is no signal for initiating the system pursuant to an urgent situation, and the signal for a pedal effort active control mode is generated. The pedal effort control system is determined to be in a normal state in the pedal effort control system determining step.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus not limiting the present disclosure.

Figure 1:
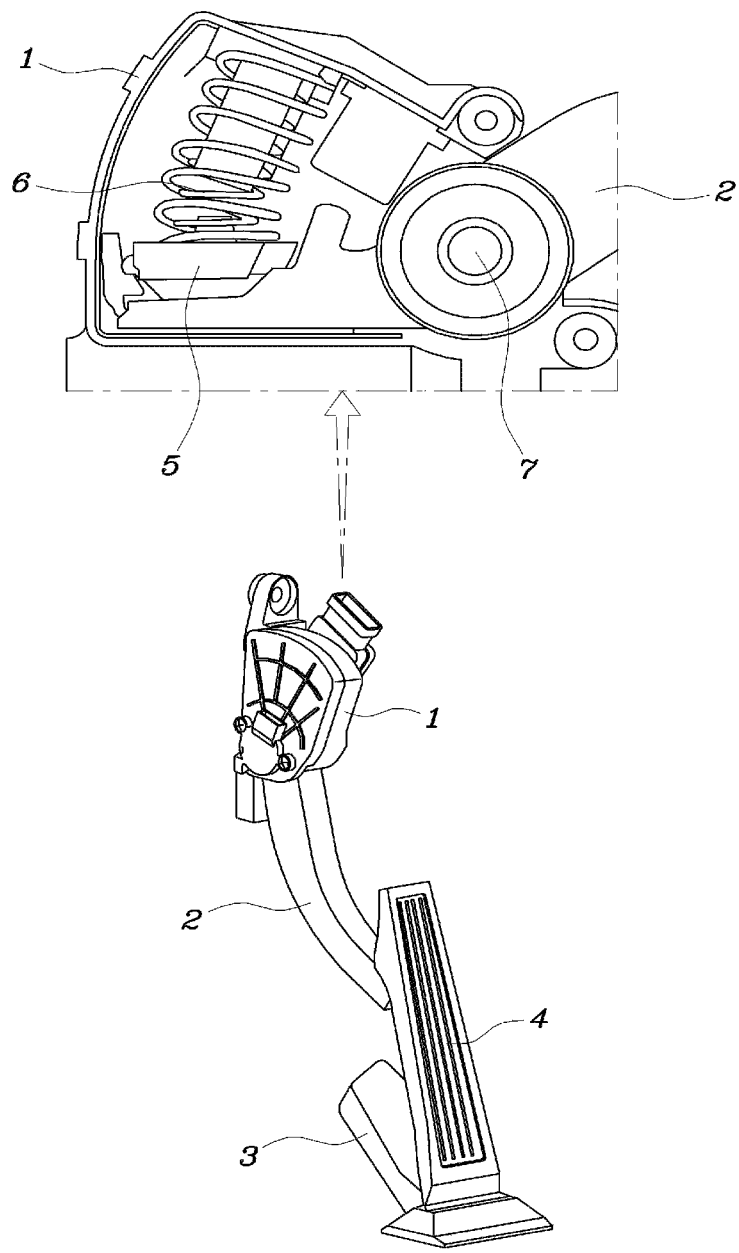
FIG. 1 is a perspective view illustrating an accelerator not having a pedal effort control function according to the related art.
Figure 2:
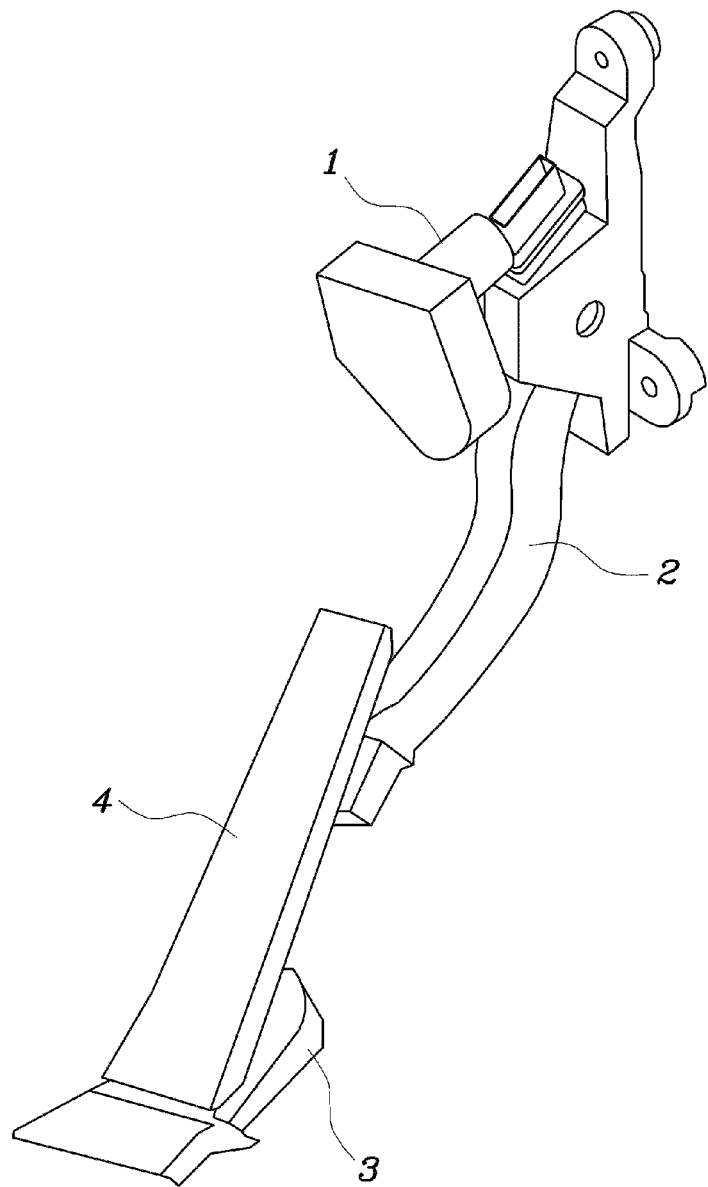
FIGS. 2 to 5 are views illustrating an accelerator having a pedal effort control function according to an embodiment of the present disclosure, respectively.

It should be understood that the appended drawings are not necessarily to scale, and present a somewhat simplified representation of various preferred features illustrative of the basic principles of the disclosure. The specific design features of the described embodiment as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Referring to FIGS. 2 through 5, an accelerator for a vehicle having a pedal effort control function may include a pedal arm housing 1 fixed to a vehicle body panel under a driver's seat, a pedal arm 2 with one end rotatably connected to the pedal arm housing 1, a pedal bracket 3 fixed to a floor panel under a driver's seat, and a pedal pad 4 with one end rotatably hinged to the pedal bracket 3 and the other end ball-jointed to the pedal arm 2.

A spring plate 5 may be connected to one end of the pedal arm 2 which is disposed in the pedal arm housing 1, and the pedal arm 2 may be rotatably connected to the pedal arm housing 1 through a hinge shaft 7.

An accelerator provides a pedal effort control module 10, including: a spring 11 with one end supported by an end of the pedal arm 2 which is disposed in the pedal arm housing 1; a spring fixing block 12 arranged to support the other end of the spring 11; a motor 13 fixed to the pedal arm housing 1; and a power transmitter 14 that transmits power from the motor 13 to the spring fixing block 12 and moves the spring fixing block 12 to vary a length of the spring 11.

Figure 3:
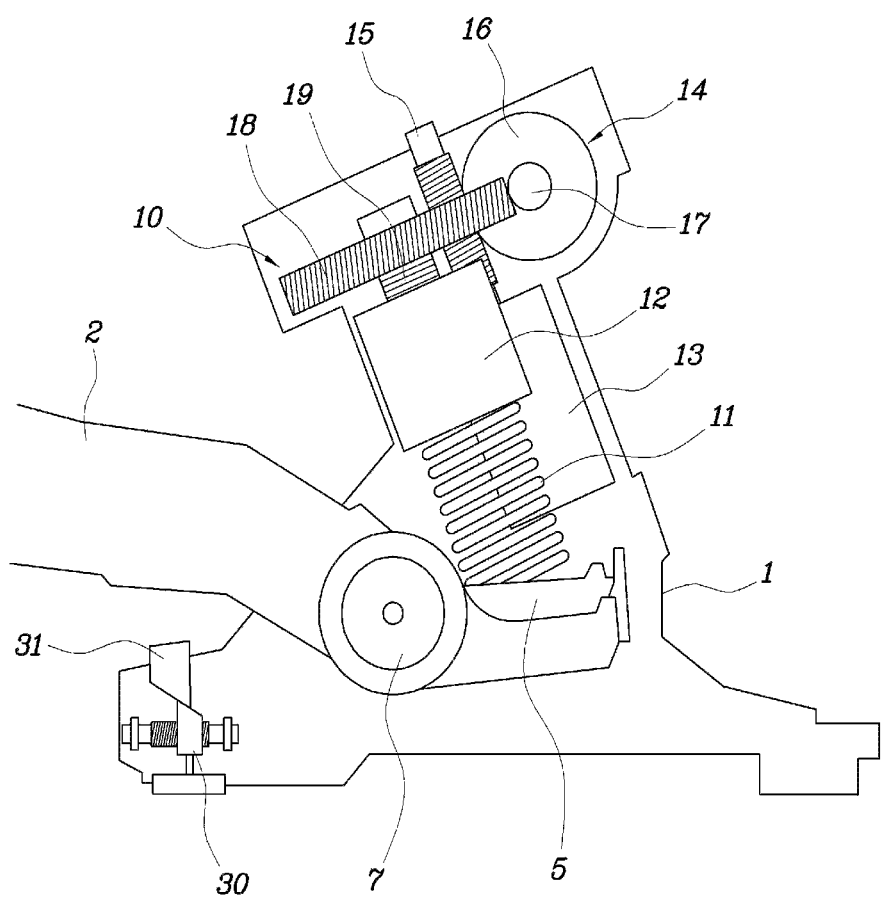
Figure 4:
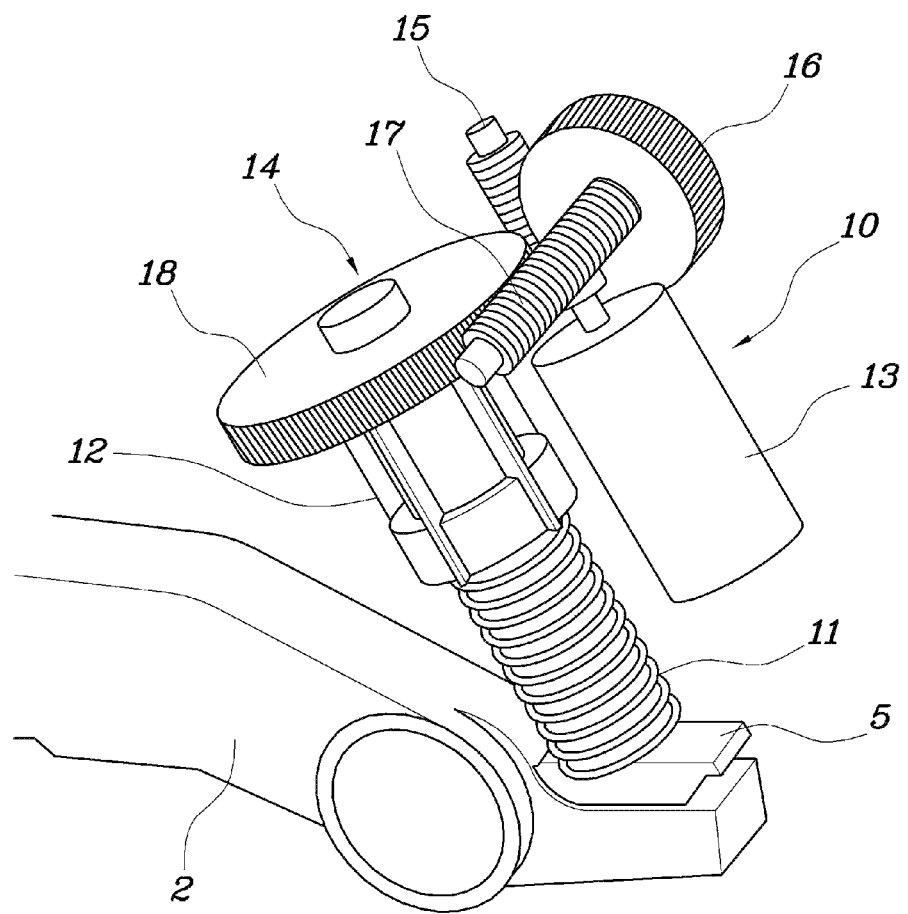

Referring to FIGS. 3 and 4, the spring 11 may be supported directly by one end of the pedal arm 2, or the lower part of the spring 11 may be supported by the spring plate 5. The spring plate 5 is connected to one end of the pedal arm 2 disposed in the pedal arm housing 1.

Accordingly, when the pedal arm 2 rotates around the hinge shaft 7, the spring 11 is compressed and elastically deformed between the spring plate 5 and the spring fixing block 12, and pedal effort is transmitted to the pedal pad 4 through the pedal arm 2.

The power transmitter 14 is arranged to connect the motor 13 and the spring fixing block 12 for transmitting power from the motor 13 to the spring fixing block 12. The power transmitter 14 includes a first worm gear 15 integrally coupled to a shaft of the motor 13, a first worm wheel gear 16 meshed with the first worm gear 15, a second worm gear 17 integrally coupled to a center of the first worm wheel gear 16, a second worm wheel gear 18 meshed with the second worm gear 17, and a gear bolt 19 which integrally protrudes from a center of the second worm wheel gear 18 and on an outer peripheral surface of which a plurality of threads are formed.

Figure 5:
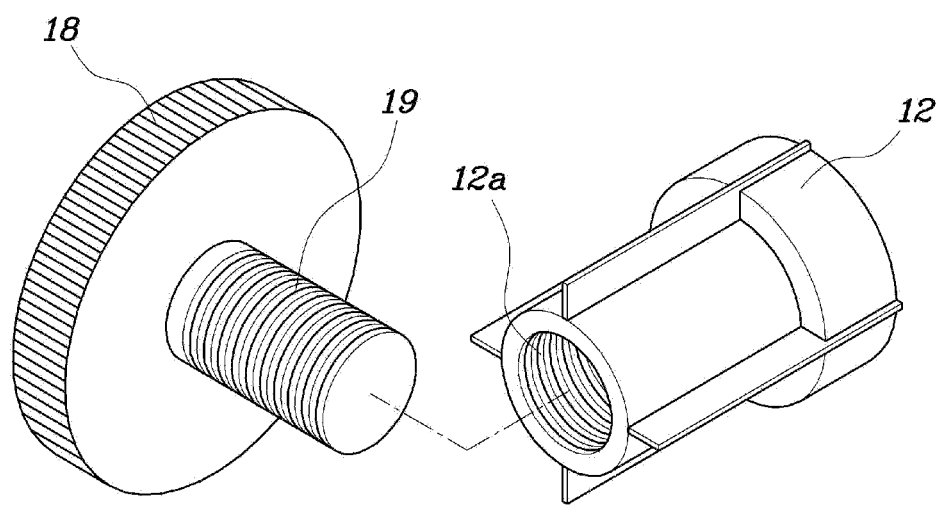

Referring to FIG. 5, a plurality of screw-grooves 12a are processed on an inner peripheral surface of the spring fixing block 12 to be screw-fastened with the gear bolt 19. When the second worm wheel gear 18 rotates, the spring fixing block 12 moves straightly along the gear bolt 19 to vary a length of the spring 11 thereby varying pedal effort.

An operation of the motor 13 may be controlled automatically by a controller (not shown) in accordance with a driving condition, a driver's condition, the locations of the shifting stages, etc.

A vehicle provided with the accelerator having a controllable pedal effort of using the pedal effort control module 10 can be actively varied to increase to a set target pedal effort when an engine-off signal for the vehicle is generated.

However, pedal effort for an accelerator used currently can not be actively varied in accordance with situations. Therefore, when foreign substance is introduced therein, the accelerator is kept at a pressed state (operated state) since the accelerator is operated with a small force. If a driver is not aware of the pressed state of the accelerator when a vehicle engine starts, gears are shifted for driving, and releasing signals for brakes (main brake and parking brake) are continuously generated, there may be a rapid starting or a rapid acceleration, thereby threatening safe driving.

Further, in a situation where an accelerator is pressed, when a vehicle engine starts, RPM increases abruptly unnecessarily consuming much fuel.

Accordingly, when an engine-off signal is generated, the current pedal effort is varied to a higher set target pedal effort, and thus preventing the pressed state (operated state) of the accelerator even when the accelerator is disturbed by a foreign substance.

When the pressed state of the accelerator is prevented with an engine being started, a gear is shifted for driving, signals for releasing brakes are generated, and thus preventing the rapid vehicle starting or rapid acceleration and unnecessary consumption of fuel.

Furthermore, in a case where an engine-on signal is generated after the vehicle engine is off, pedal effort can be varied from a high level to lower level again and, thus, a driver can easily operate the accelerator.

Figure 6:
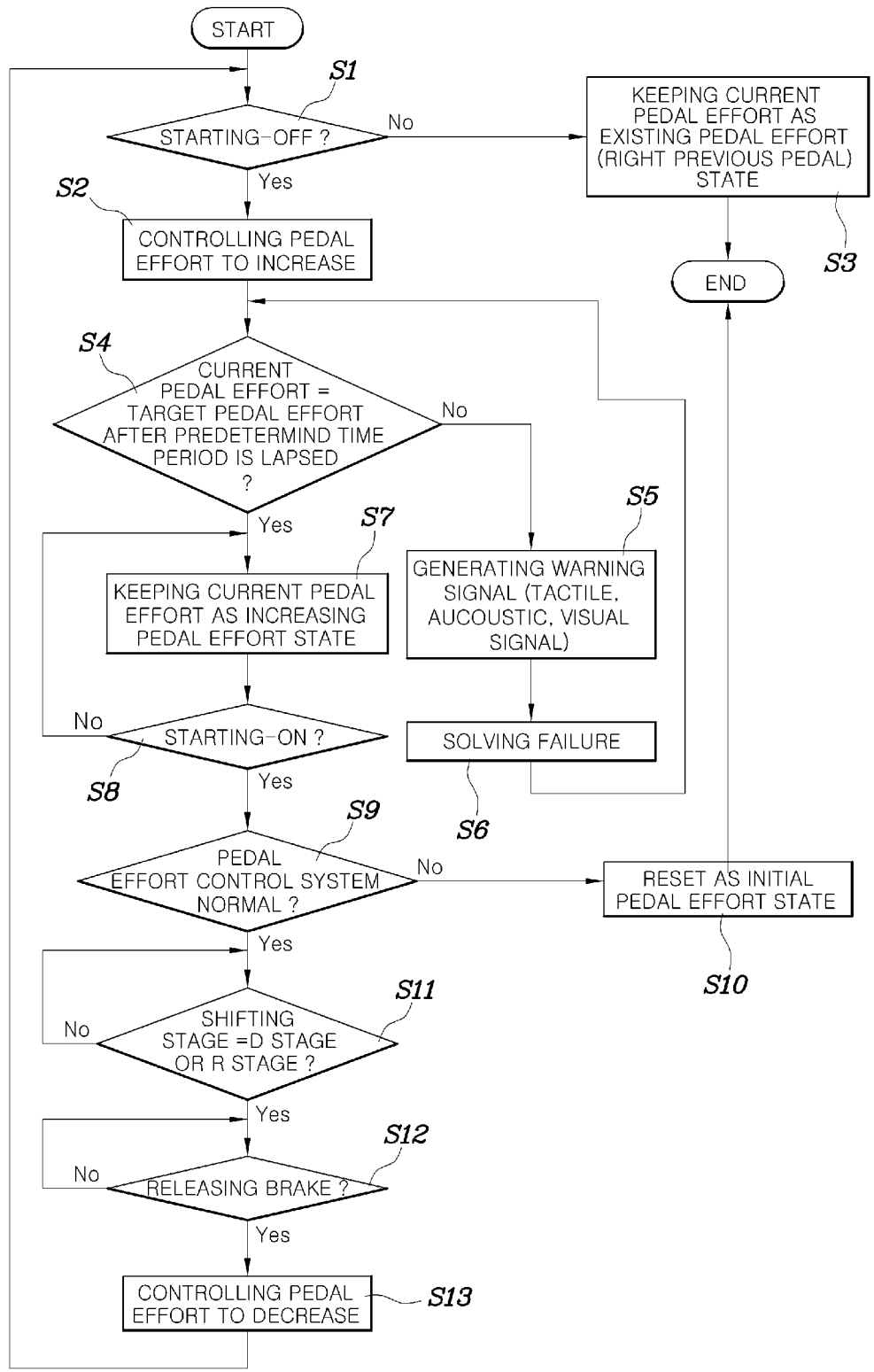
FIG. 6 is a flow chart illustrating a method of actively controlling pedal effort for an accelerator having a pedal effort control function according to an embodiment of the present disclosure.

Referring to FIG. 6, an active control method of pedal effort for an accelerator may include: determining whether an engine-off signal for a vehicle is generated with an accelerator having a controllable pedal effort; controlling the current pedal effort for the accelerator to a set target pedal effort when the engine-off signal has been generated in the engine-off determining step; determining whether an engine-on signal is generated in the pedal effort increasing control step; and decreasing the increased pedal effort for the accelerator to a set target pedal effort in accordance with the location of the brake and the signals for releasing the brakes when the engine-on signal has been generated in the engine-on determining step.

If the engine-off signal has not been generated, the current pedal effort is not controlled to increase to a set target pedal effort but maintained at an existing pedal effort (previous pedal effort) state.

The active control method further includes a step for determining whether the pedal effort corresponds to a target pedal effort after predetermined time period is lapsed between the pedal effort increasing step and the engine-on determining step. In the pedal effort determining step, a warning signal is provided to a driver when the pedal effort does not correspond to a target pedal effort The pedal effort is kept in an increasing state when the pedal effort corresponds to the target pedal effort.

The warning signal may be a tactile signal using shake and vibration of the pedal caused from an operation of the motor 13, an acoustic signal using a sound producer, or a visual signal.

If the engine-on signal is not generated in the engine-on determining step, the current pedal effort remains as pedal effort in the pedal effort increasing step.

Further, when the signals for releasing the brakes are generated with a driving D stage or a reverse R stage, after the engine-on step, the pedal effort decreasing step is performed.

The active control method further includes a step for determining whether the pedal effort control system is in a normal state before determining the locations of the shifting stages, and whether the signals for releasing the brakes are generated in the pedal effort decreasing control step.

In the pedal effort control system determining step, only when the pedal effort control system is in a normal state, a logic for determining locations of the shifting stages and the signals for releasing the brakes is performed. When the pedal effort control system is in an abnormal state, the current pedal effort for an accelerator is reset to an initial pedal effort state. Here, the initial pedal effort state refers to a reset state of the pedal effort.

In the pedal effort control system determining step, the pedal effort control system is in a normal state only when all conditions are satisfied, such that a voltage signal of a battery is normal, a signal for initializing the system is not requested, and the signal for a pedal effort active control mode is generated.

Hereinafter, the operations of the present embodiment according to the present disclosure will be described.

Referring to FIG. 3, the motor 13 is operated by a controller, and power from the motor 13 is transmitted to the spring fixing block 12 through the worm gears 15, 17, the worm wheel gears 16, 18 and the gear bolt 19. The spring fixing block 12 moves upward or downward along the gear bolt 19.

When the spring fixing block 12 moves upward along the gear bolt 19 (to a receding direction from the spring plate), the spring 11 is lengthened through its elastic recovery, and pedal effort for an accelerator decreases due to the decreasing of spring force on the pedal arm 2.

On the contrary, when the spring fixing block 12 moves downward along the gear bolt 19 (to an approaching direction to the spring plate), the spring 11 is shortened by being compressed, and pedal effort for an accelerator increases due to the increasing of spring force on the pedal arm 2.

The motor 13 operates automatically with a controller (not shown). For example, when an engine-off signal is generated, pedal effort for an accelerator can be actively increased. Further, when an engine-on signal is generated, the increasing pedal effort for an accelerator is decreased back to a target pedal effort.

Pedal effort is controlled to be in a lower level during low speed driving (downtown driving) thereby reducing fatigue caused from operating an accelerator. Pedal effort is controlled to be increased during high speed driving (expressway driving) thereby reducing ankle fatigue of a driver by constantly supporting the pedal.

Furthermore, pedal effort is decreased to increase pedal operation amount on an uphill road while being increased to decrease the pedal operation amount on a downhill road.

Pedal effort is increased to ensure safety mode or safety during over speed driving. Further pedal effort may be controlled taking into consideration the age, sex, or condition of a driver.

Referring to FIG. 6, a controller determines whether an engine-off signal is generated in a vehicle (step S1). When the engine-off signal has been generated, the current pedal effort for an accelerator is increased to a set target pedal effort (step S2).

However, when the engine-off signal has not been generated, the current pedal effort for an accelerator may not be increased to a set target pedal effort but kept as an existing pedal effort (previous pedal effort) state, and forcibly ending the control logic (step S3).

Furthermore, when pedal effort for the accelerator is increased to a set target pedal effort at step S2, the pedal effort for the accelerator corresponds to a target pedal effort after predetermined time period is lapsed. That is, pedal effort for the accelerator is determined to be increased to a target pedal effort (step S4).

If the increasing pedal effort for the accelerator does not correspond to the target pedal effort, a warning signal such as a tactile signal, an acoustic signal, or a visual signal is provided to a driver (step S5) enabling the driver to recognize the warning signal and to solve a failure of an accelerator such as foreign substance introduction therein (step S6). The logic feeds back to step S4 after step S6.

In a case where the increased pedal effort for an accelerator corresponds to the target pedal effort, the current pedal effort is maintained continuously as the increased pedal effort state (step S7).

Step S7 further determines whether an engine-on signal is generated from the vehicle with engine-off after step S7 (step 8). When the engine-on signal has not been generated, the logic feeds back to step 7, and thus maintaining the current pedal effort as the increased pedal effort from step S7.

However, if the engine-on signal has been generated, step S9 determines whether the pedal effort control system is in a normal state (step S9). The pedal effort control system is determined to be in a normal state only when all conditions are satisfied such that a voltage signal of a battery is in a normal state, and therefore there is no signal for initiating the system pursuant to an urgent situation, and the signal for a pedal effort active control mode is generated.

The pedal effort control system is determined as being in an abnormal state, when the voltage signal of a battery is less than 9V or more than 16.5V.

If the pedal effort control system is determined to be in an abnormal state, the current pedal effort for an accelerator is reset to the initial pedal effort state (step S10).

When the pedal effort control system is determined to be in a normal state, logic for determining the location of the shifting stage and signals for releasing brakes is generated, and the pedal effort is controlled to be decreased back to a set target pedal effort (step S13) in accordance with the location of the shifting stage (step S11) and the signals for releasing the brakes (step 12).

That is, when the pedal effort control system is in a normal state, the current shifting stage is in a driving D stage or a reverse R stage, and the signals for releasing a main brake and a parking brake are generated continuously. At this time, only when the signals for releasing the brakes have been generated with the shifting stage in the driving D stage or the reverse R stage, the increasing pedal effort for an accelerator is decreased to a set target pedal effort, and repeating step S1.

If the shifting stage is neither on the driving D stage nor on the reverse R stage, the logic feeds back to step S11. When the signals for releasing the brakes have not been generated, the logic feeds back to step S12.

As described above, in a case where the engine-off signal for a vehicle in which an accelerator having a controllable pedal effort is generated, the current pedal effort for the accelerator can be increased to a set target pedal effort, thereby preventing a pushed phenomenon (operated phenomenon) of the accelerator caused by a foreign substance introduced therein. Even though the vehicle engine starts, gears are shifted for a driving, and the signals for releasing the brakes are generated, a rapid starting or a rapid acceleration can be prevented, thereby improving safety and unnecessary consumption of fuel by preventing a rapid increasing of RPM.

Under the accelerator according to an embodiment of the present disclosure, a length of the spring 11 can be varied by the movement of the spring fixing block 12 through the operation of the motor 13 without replacing separate components, thereby easily varying pedal effort if necessary, to fully satisfy the safety regulations with respect to pedal effort for an accelerator regardless of the type of vehicle.

Further, when the engine-off signal is generated after driving, pedal effort for the accelerator can be actively increased, and thus preventing a rapid starting or rapid acceleration of the vehicle when the engine starts, improving safety, and reducing unnecessary consumption of fuel.

The present disclosure has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. An active control method of a pedal effort for an accelerator, comprising:
    an engine-off determining step for determining whether an engine-off signal for a vehicle is generated in the vehicle provided with an accelerator having a controllable pedal effort;
    a pedal effort increasing step for increasing the pedal effort to a first target pedal effort when the engine-off signal has been generated in an engine-off determining step;
    an engine-on determining step for determining whether an engine-on signal for the vehicle is generated after the pedal effort is increased to the first target pedal effort; and
    a pedal effort decreasing step for decreasing the increased pedal effort to a second target pedal effort in accordance with a location of a shifting stage, and whether a signal for releasing a brake is generated, when the engine-on signal is generated.

2. The active control method of claim 1, wherein the pedal effort for the accelerator is not increased but kept in an existing pedal effort state, when the engine-off signal has not been generated in the engine-off determining step.

3. The active control method of claim 1, further comprising a pedal effort determining step for determining whether the increased pedal effort corresponds to the first target pedal effort after a predetermined time period is lapsed between the pedal effort increasing step and the engine-on determining step, wherein in the pedal effort determining step, when the increased pedal effort does not correspond to the first target pedal effort, a warning signal is provided to a driver, and the pedal effort is kept in an increasing pedal effort state until the increased pedal effort for an accelerator corresponds to the first target pedal effort.

4. The active control method of claim 3, wherein the pedal effort decreasing step is performed only when the signal for releasing the brake is generated while the shifting stage is on a driving stage or a reverse stage after the engine-on determining step.

5. The active control method of claim 1, wherein the pedal effort is maintained as the increased pedal effort through the pedal effort increasing step, when the engine-on signal has not been generated in the engine-on determining step.

6. The active control method of claim 1, further comprising a pedal effort control system determining step for determining whether a pedal effort control system is in a normal state before determining the location of the shifting stage, and whether the signal for releasing the brake is generated in the pedal effort decreasing step.

7. The active control method of claim 6, wherein a logic for determining the location of the shifting stage and whether the signal for releasing the brake is generated is performed only when the pedal effort control system is in the normal state in the pedal effort control system determining step, and when the pedal effort control system is in an abnormal state, the pedal effort is reset as an initial pedal effort.

8. The active control method of claim 6, wherein only when all conditions are satisfied such that a voltage signal of a battery is normal, there is no signal for initiating the pedal effort control system pursuant to an urgent situation, and a signal for a pedal effort active control mode is generated, the pedal effort control system is determined to be in the normal state in the pedal effort control system determining step.

* * * * *